US012724988B2

(12) United States Patent
Cha et al.

(10) Patent No.: US 12,724,988 B2
(45) Date of Patent: Sep. 1, 2026

(54) PEER TO PEER CONVERSATION CAPTIONING SYSTEM

(71) Applicant: Mezmo Corporation, Buena Park, CA (US)

(72) Inventors: Wonjae Cha, Irvine, CA (US); John H Lee, Irvine, CA (US); Haesung Lee, Irvine, CA (US)

(73) Assignee: Mezmo Corporation, Irvine, CA (US)

( * ) Notice: Subject to any disclaimer, the term of this patent is extended or adjusted under 35 U.S.C. 154(b) by 337 days.

(21) Appl. No.: 18/654,858

(22) Filed: May 3, 2024

(65) Prior Publication Data

US 2025/0342325 A1 Nov. 6, 2025

(51) Int. Cl.

*G06F 40/00* (2020.01)
*G06F 40/58* (2020.01)
*G10L 15/26* (2006.01)
*G10L 15/30* (2013.01)

(52) U.S. Cl.

CPC .............. *G06F 40/58* (2020.01); *G10L 15/26* (2013.01); *G10L 15/30* (2013.01)

(58) Field of Classification Search

CPC ......... G10L 15/07; G10L 15/20; G10L 15/22; G10L 15/26; G10L 15/30; G10L 15/02; G10L 15/08; G10L 15/063; G10L 15/1822; G10L 15/183; G10L 15/193; G10L 15/19; G10L 15/1815; H04W 4/06; G06F 40/58

See application file for complete search history.

*Primary Examiner* — Vu B Hang

(74) *Attorney, Agent, or Firm* — Heedong Chae; Lucem, PC

(57) ABSTRACT

A peer-to-peer conversation captioning ("PPCC") system includes a first electronic device for a first user, a second electronic device for a second user, and a PPCC server. The PPCC system further includes a virtual relay entity, which includes a first virtual router for the first language, a second virtual router for the second language, and a global switch. The virtual routers include a speech-to-text engine, a translation engine, a text-to-speech engine, and a multiplexer. The speech-to-text engine converts a user's spoken language to texts and sends the texts to the global switch. Then, the translation engine receives and translates the texts where the text-to-speech engine converts the translated texts to voice. The multiplexer combines the translated texts and the voice to be sent to another user.

20 Claims, 10 Drawing Sheets

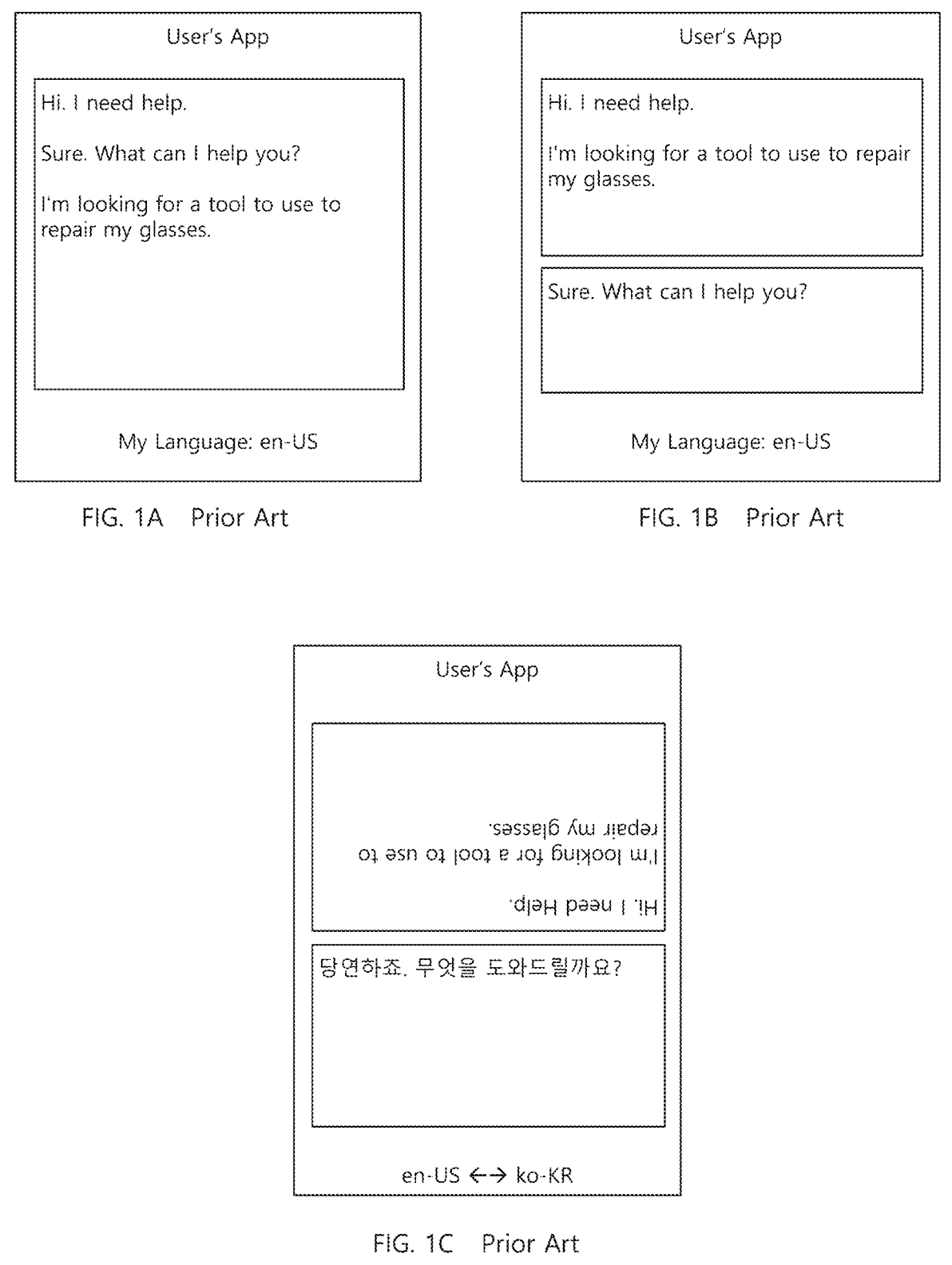

User's App

Hi. I need help.

Sure. What can I help you?

I'm looking for a tool to use to repair my glasses.

My Language: en-US

FIG. 1A Prior Art

User's App

Hi. I need help.

I'm looking for a tool to use to repair my glasses.

Sure. What can I help you?

My Language: en-US

FIG. 1B Prior Art

User's App

Hi. I need Help.

I'm looking for a tool to use to repair my glasses.

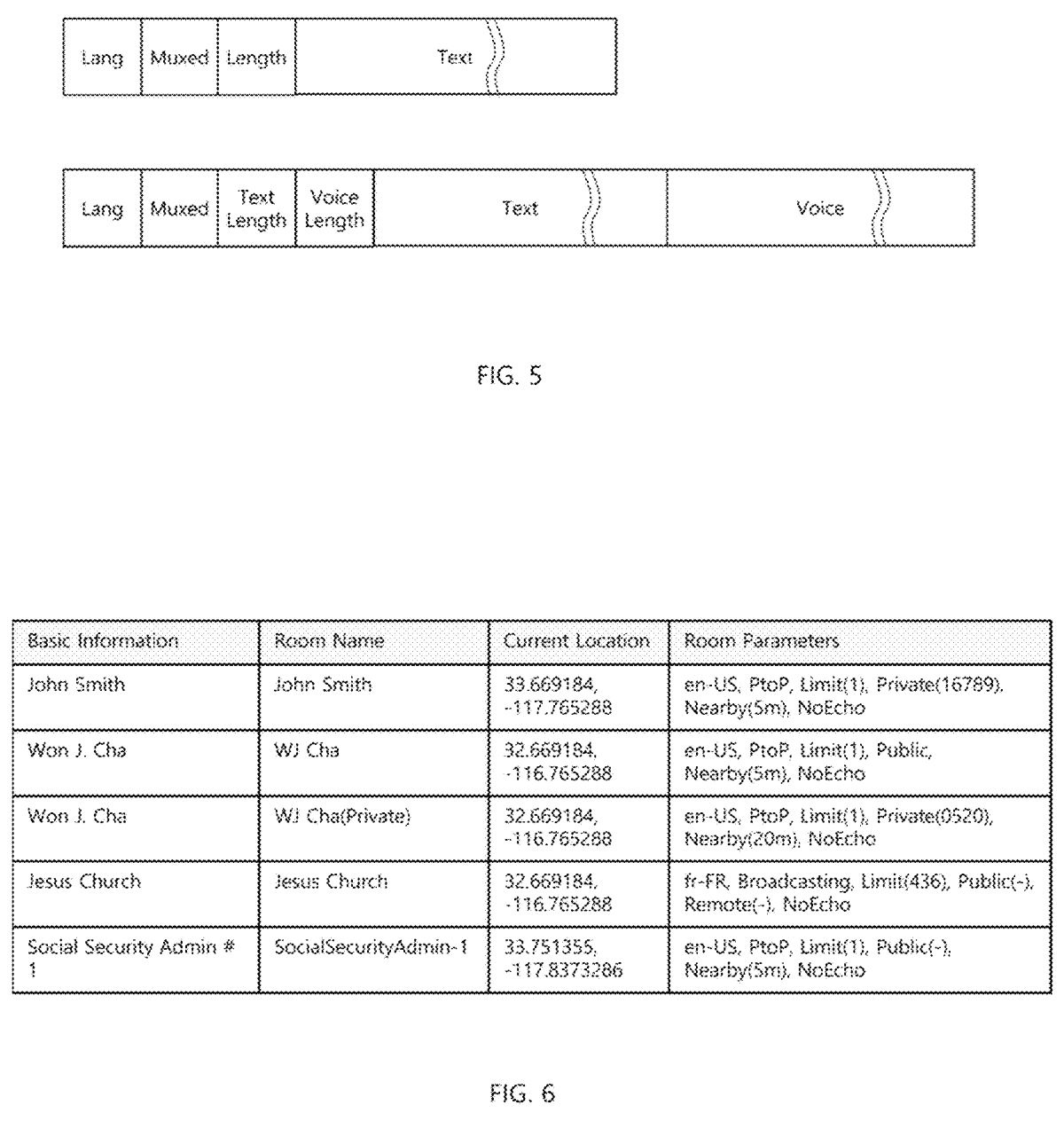

| Lang | Muxed | Length | Text |
|---|---|---|---|

| Lang | Muxed | Text Length | Voice Length | Text | Voice |
|---|---|---|---|---|---|

FIG. 5

| Basic Information | Room Name | Current Location | Room Parameters |
|---|---|---|---|
| John Smith | John Smith | 33.669184, -117.765288 | en-US, PtoP, Limit(1), Private(16789), Nearby(5m), NoEcho |
| Won J. Cha | WJ Cha | 32.669184, -116.765288 | en-US, PtoP, Limit(1), Public, Nearby(5m), NoEcho |
| Won J. Cha | WJ Cha(Private) | 32.669184, -116.765288 | en-US, PtoP, Limit(1), Private(0520), Nearby(20m), NoEcho |
| Jesus Church | Jesus Church | 32.669184, -116.765288 | fr-FR, Broadcasting, Limit(436), Public(-), Remote(-), NoEcho |
| Social Security Admin # 1 | SocialSecurityAdmin-1 | 33.751355, -117.8373286 | en-US, PtoP, Limit(1), Public(-), Nearby(5m), NoEcho |

FIG. 6

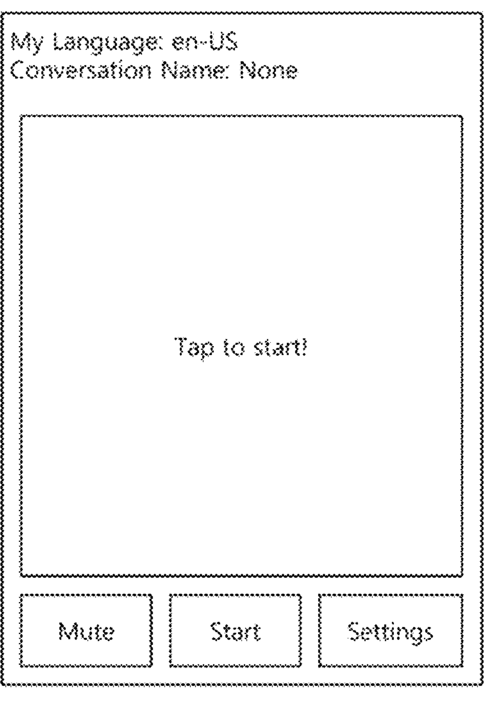

FIG. 7A

My Language: en-US
Conversation Name: WJ Cha
Select
PN WJ Cha 1
PN SocialSecurityAdmin-1 1
PN SocialSecurityAdmin-2 1
PN SocialSecurityAdmin-3 2
BN Jesus Church 436
Manual:
Mute
Start
Settings

FIG. 7B

My Language: en-US
Conversation Name: WJ Cha
Hi. I need help.
I'm looking for a tool to use to repair my glasses.
Sure. What can I help you?
Mute
Stop
Settings

FIG. 7C

My Language: en-US
Conversation Name: Help Desk
(Jay Cha)
Hi. I need help.
(Paul)
Sorry. I'm so busy now. John, can you help this guest?
(me)
Sure.
What can I help you?
Mute
Stop
Settings

FIG. 7D

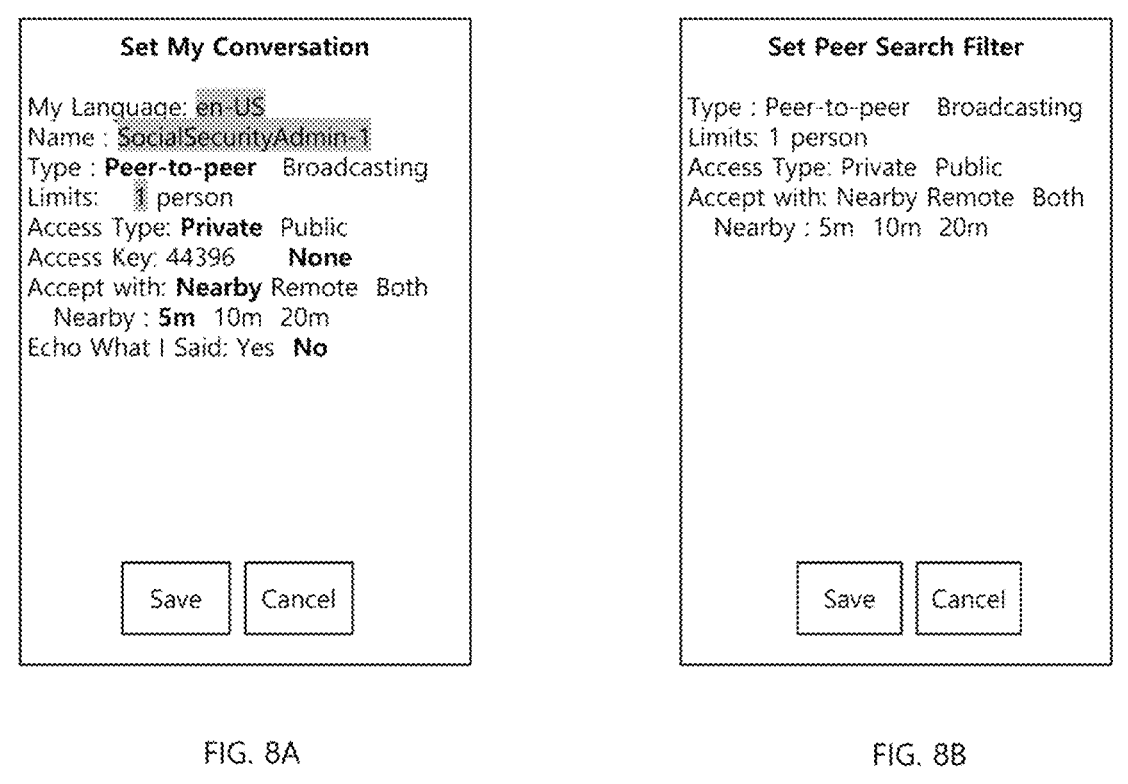

Set My Conversation

My Language: en-US
Name : SocialSecurityAdmin-1
Type : Peer-to-peer Broadcasting
Limits: 1 person
Access Type: Private Public
Access Key: 44396 None
Accept with: Nearby Remote Both
Nearby : 5m 10m 20m
Echo What I Said: Yes No

Save Cancel

FIG. 8A

Set Peer Search Filter

Type : Peer-to-peer Broadcasting
Limits: 1 person
Access Type: Private Public
Accept with: Nearby Remote Both
Nearby : 5m 10m 20m Save Cancel

FIG. 8B

PEER TO PEER CONVERSATION CAPTIONING SYSTEM

FIELD OF THE INVENTION

The present invention relates to a peer-to-peer conversation captioning ("PPCC") system designed for hearing-impaired individuals or for facilitating communication between individuals who speak different languages, by providing transcription of each other's spoken language. The PPCC system comprises a first electronic device, a second electronic device, and a server. The server hosts a virtual relay entity, which includes multiple virtual routers, each virtual router being dedicated to a specific language. PPCC applications set for the same language are connected to a dedicated virtual router, and each virtual router is linked to other routers through a global switch.

BACKGROUND OF THE INVENTION

A captioned telephone service ("CTS"), also known as a transcription service, assists individuals-particularly those who are deaf or hard of hearing ("DHH") but can speak-in making phone calls. This service, which can be provided by a human operator known as a call agent or by an automatic speech recognition ("ASR") engine, transcribes the spoken language of a conversation partner (the "peer") from the peer's device into caption data. This data is then sent to the user's device, displayed as text, allowing the DHH user to read what is being said in real-time.

The user's device might be any personal communications device such as a mobile phone, smart phone, landline, or a terminal provided by a CTS provider. The user can make or receive calls using a dedicated application installed on this device and can access transcription services facilitated by the CTS server connected to either a call agent or ASR engine.

However, such a CTS is not suitable for fact-to-face or peer-to-peer conversations. Many hearing-impaired individuals rely on IP relay services or CTS to communicate with others but still face challenges with peer-to-peer conversations, including face-to-face conversations. This difficulty is particularly pronounced among older individuals who develop hearing impairments and may feel socially isolated due to their reluctance or inability to learn sign language. Even with CTS services, there are practical hurdles, such as needing to request phone numbers to initiate conversations.

Additional challenges arise for individuals living overseas who do not speak the local language and experience barriers similar to those with hearing impairments. While many applications have been developed to address these issues, they often fall short due to practical limitations such as the need to rotate the device to optimize microphone use, or the restrictions imposed by push-to-talk ("PTT") interfaces that prevent simultaneous speaking. These applications typically require users to launch and extend them towards others, complicating interactions, especially in group settings where simultaneous conversations are not supported. FIGS. 1A, 1B, and 1C illustrate such user interfaces of conventional translation applications.

FIG. 1A displays a single window that alternates between transcribing the user's and the peer's spoken languages. FIG. 1B features two separate windows, one for the user and another for the peer. FIG. 1C presents another configuration with two windows, where the upper window is inverted to allow the peer to view it more conveniently. The microphone is located at the bottom of the user device, requiring the user to flip the device so that the peer can speak directly into the microphone. Furthermore, the applications do not support simultaneous speaking.

These interfaces demonstrate the ongoing need for more user-oriented solutions in communication technology for the hearing impaired and multilingual populations.

Recognizing these issues, the present invention aims to address them by providing a PPCC system designed for hearing-impaired individuals or for facilitating communication between individuals who speak different languages, by using the electronic devices of the users and providing transcription of each other's spoken language.

This invention is directed to solve these problems and satisfy the long-felt need.

SUMMARY OF THE INVENTION

The present invention contrives to solve the disadvantages of the prior art. The present invention provides a PPCC system designed for hearing-impaired individuals or for facilitating communication between individuals who speak different languages, by using the electronic devices of the users and providing transcription of each other's spoken language.

The object of the present invention is to provide a PPCC system that includes a first electronic device for a first user, a second electronic device for a second user, and a PPCC server. A PPCC application is installed on the first electronic device, and another PPCC application is installed on the second electronic device. The first user's spoken language is a first language, and the PPCC application of the first electronic device is set to the first language. The second user's spoken language is a second language, and the PPCC application of the second electronic device is set to the second language.

The PPCC system further includes a virtual relay entity, which includes a first virtual router for the first language, a second virtual router for the second language, and a global switch. The virtual relay entity includes multiple virtual routers, and each virtual router is responsible for only one language. The first virtual router includes a speech-to-text engine and a translation engine. The speech-to-text engine is constructed to convert the first user's spoken language in the first language into transcribed texts in the first language and send the transcribed texts in the first language to the global switch. In addition, the translation engine of the first virtual router is configured to receive texts in a language other than the first language and is constructed to translate the texts in the language other than the first language into translated texts in the first language.

The first virtual router further includes a text-to-speech engine and a multiplexer. The text-to-speech engine receives the translated texts in the first language from the translation engine and converts them into spoken language in the first language. The multiplexer is configured to receive the translated texts in the first language from the translation engine and the spoken language in the first language from the text-to-speech engine, and the multiplexer is configured to combine the translated texts in the first language and the spoken language in the first language and send them to the PPCC application of the first electronic device.

The PPCC system may be constructed to initiate the conversation between the first electronic device and the second electronic device by using Near Field Communication ("NFC") handshake or Bluetooth pairing handshake between the first electronic device and the second electronic device. Alternatively or additionally, the PPCC system may be constructed to initiate the conversation between the first electronic device and the second electronic device by detecting a collision between the first electronic device and the second electronic device using an accelerometer sensor.

Another object of the present invention is to provide a face-to-face conversation captioning ("FFCC") system, which includes a first electronic device for a first user, a second electronic device for a second user, and an FFCC server. The first user's spoken language is a first language, and the second user's spoken language is a second language. An FFCC application is installed respectively on the first electronic device and the second electronic device where the FFCC application of the first electronic device is set to the first language and the FFCC application of the second electronic device is set to the second language. The FFCC system further includes a virtual relay entity, which includes a first virtual router for the first language, a second virtual router for the second language, and a global switch.

The first virtual router includes a speech-to-text engine, a translation engine, a text-to-speech engine, and a multiplexer. The PPCC system may be constructed to initiate the conversation between the first electronic device and the second electronic device by using Near Field Communication ("NFC") handshake or Bluetooth pairing handshake between the first electronic device and the second electronic device. Alternatively or additionally, the PPCC system may be constructed to initiate the conversation between the first electronic device and the second electronic device by detecting a collision between the first electronic device and the second electronic device using an accelerometer sensor.

The advantages of the present invention are: (1) Accessibility for Hearing-impaired Individuals: The PPCC system of the present invention enables a hearing-impaired individual to converse with another person directly in front of them using their own device, facilitating real-time communication; (2) Multilingual Communication: The PPCC system of the present invention allows individuals who speak different languages to freely converse with each other using their respective devices; (3) User-friendly Interface: Users can set their native language in the application settings and select a nearby user with the same application. By speaking into their own device's microphone, the nearby user's speech is transcribed and displayed on the user's device screen in the user's native language and the user's speech is transcribed and displayed on the nearby user's device screen in the nearby user's native language, enabling seamless communication; (4) Privacy and Security: Since all communication occurs through individual devices, there is no need to share personal information with the conversation partner's device, thus protecting personal information; (5) Simplified Interaction: Users simply read the text displayed in their native language on their own device and respond in the same language, making conversations straightforward and effective; (6) Versatile Captioning Options: The system is equipped to provide captioning for various scenarios, including one-to-one conversations, group interactions, or broadcasting situations; (7) Assistance at Service Desks: It is also ideal for use in person-to-person help desks at locations like government offices, hospitals, banks, and sales counters, where assistance for multilingual users or hearing-impaired individuals is crucial; and (8) Simultaneous Conversation between Two or More Users: Since each user is using his own electronic device, simultaneous communication is possible by the PPCC system and the user does not have to flip his phone to another person for receiving transcription of that person's spoken language.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIGS. 1A, 1B, and 1C show user interfaces of conventional translation applications;

FIG. 5 shows two exemplary types of data frame structures according to the present invention;

FIG. 6 shows the information on user conversation rooms stored in the Database Management System ("DBMS") according to the present invention;

FIGS. 7A, 7B, 7C, and 7D illustrate examples of user interfaces for the PPCC application according to the present invention;

FIGS. 8A and 8B illustrate examples of user interfaces for the settings of the PPCC application according to the present invention;

DETAILED DESCRIPTION OF EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 2:
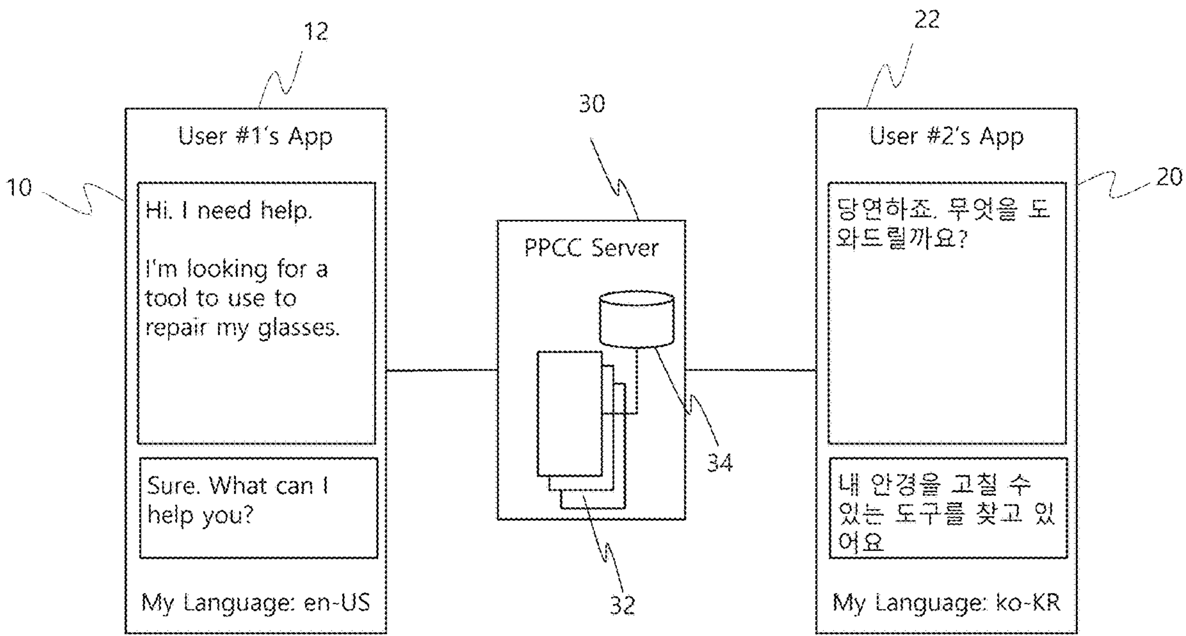
FIG. 2 shows the structure of the PPCC system according to the present invention.
Figure 3:
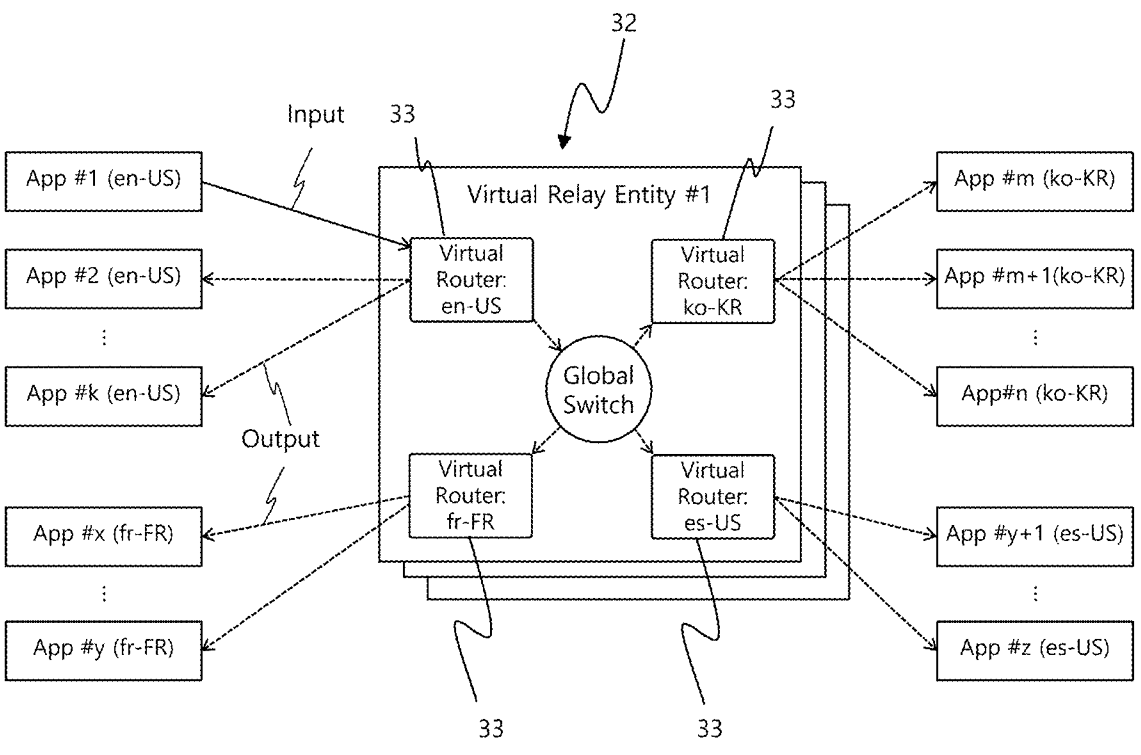
FIG. 3 shows the virtual relay entity of the PPCC system according to the present invention.
Figure 4:
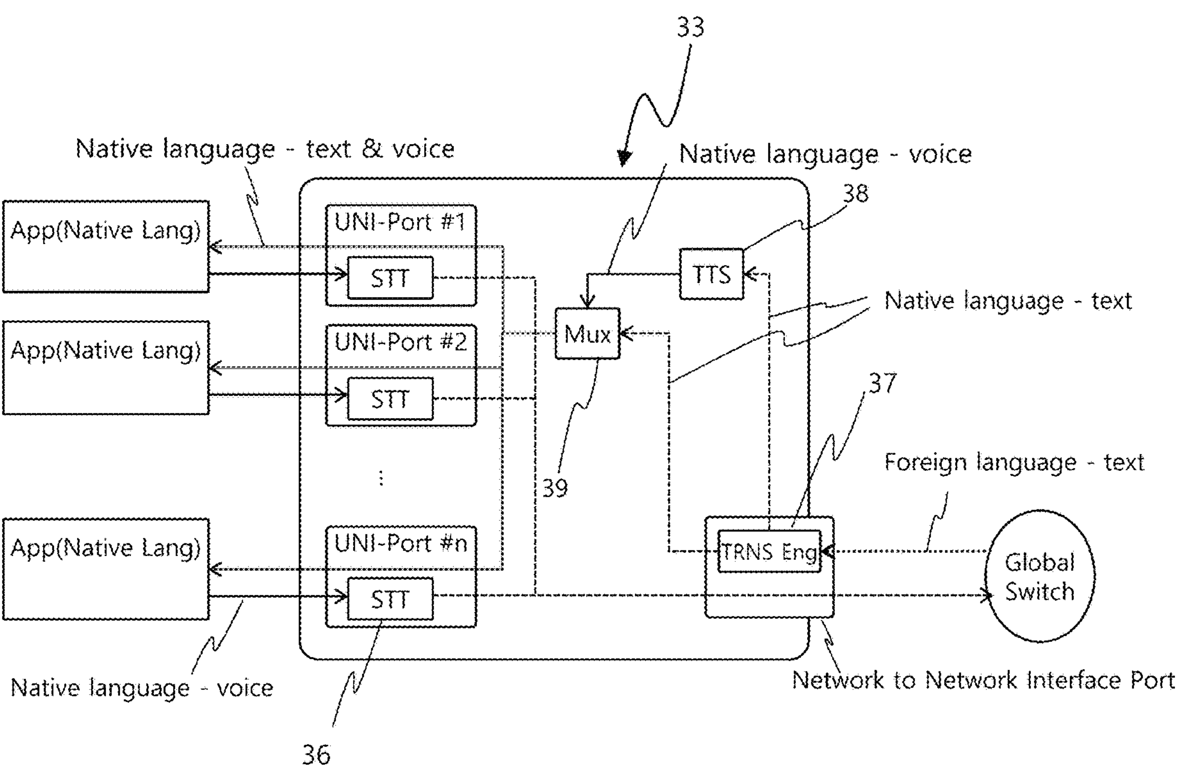
FIG. 4 shows the virtual router of the PPCC system according to the present invention.

FIG. 2 shows a peer to peer conversation captioning ("PPCC") system 100. FIGS. 3 and 4 respectively show the virtual relay entity 32 and the virtual router 33 of the PPCC system 100. The PPCC system 100 includes a first electronic device 10 for a first user, a second electronic device 20 for a second user, and a PPCC server 30. A PPCC application 12 is installed on the first electronic device 10, and another PPCC application 22 is installed on the second electronic device. The first user's spoken language is a first language, and the PPCC application 12 of the first electronic device 10 is set to the first language. The second user's spoken language is a second language, and the PPCC application 22 of the second electronic device 20 is set to the second language. The electronic devices 10, 20 may be a smart phone, mobile phone, PDA, tablet computer, smart watch, etc.

The PPCC system 100 of the present invention can be utilized by a hearing-impaired individual, with the first user being hearing-impaired. The second user may either be hearing-impaired or not, and the first and second languages may be the same or different. Additionally, the PPCC system 100 can also be employed by individuals who speak different languages, in which case the first and second languages are not the same. If the first and second languages are the same, the first and second virtual routers are also the same. Furthermore, the PPCC system 100 can be used either for a face-to-face conversation or for remote communication.

The PPCC system 100 further includes a virtual relay entity 32, which includes a first virtual router 33 for the first language, a second virtual router 33 for the second language, and a global switch. The PPCC system 100 includes multiple virtual relay entities 32. Each conversation group of users is mapped to one virtual relay entity 32.

As shown in FIG. 3, the virtual relay entity 32 includes multiple virtual routers 33. Each virtual router 33 is responsible for only one language, and multiple applications set to that language are connected to it. For example, if a conversation group uses only one language, a single virtual router 33 for that language is created. If three languages are used, three virtual routers 33 are created according to the types of languages used. Furthermore, the virtual routers 33 are connected to the global switch in a full mesh configuration. As shown in FIG. 3, when App #1 speaks in American English (en-US), the virtual router 33 responsible for en-US broadcasts the processed results (text or text+voice) to all other applications it contains. At the same time, it uses the global switch to transmit to all virtual routers 33 responsible for different languages. Then, each virtual router 33 translates into its respective language and passes it on to the connected PPCC applications.

As shown in FIG. 3, the PPCC application 12 of the first electronic device 10 is connected to the first virtual router 33 without passing through the global switch, and the PPCC application 22 of the second electronic device 20 is connected to the second virtual router 33 without passing through the global switch. The global switch is respectively connected to the first virtual router 33 and the second virtual router 33. For example, the PPCC application 12 of the first electronic device 10 may be App #1 with the first language of English in the US whereas the PPCC application 22 of the second electronic device 20 may be App #m with the second language of Korean in Korea. Then, App #1 (en-US) is connected to the virtual router en-US, to the global switch, to the virtual router ko-KR, and then to App #m (ko-KR).

In FIGS. 3 and 4, the global switch references the language identifier (Language Flag) included in the header of all frames to deliver the received frame to the virtual routers 33 set to different languages. The virtual router 33 includes an NNI port that connects to the global switch, a text-to-speech engine 38 that converts translated native language text into native language speech, a mux 39 that acts as a mixer to facilitate the delivery of native language text and speech, and UNI ports that connect to each user's App. The NNI Port includes a translation engine 37 that converts foreign language text received from the global switch into the native language and then delivers the translated text to the text-to-speech engine 38 and multiplexer 39 within the virtual router 33. It also broadcasts the text that has been converted to the native language from the UNI port to the other UNI ports (excluding the originating UNI port, which can also echo back depending on the user's settings), and then sends it to the global switch in the form of a data frame in FIG. 5. The text-to-speech engine 38 converts texts into audio data, and the multiplexer 39 combines audio and text into a single frame as the lower image of FIG. 5. The UNI Port provides connectivity to each user's PPCC application and copies the user's configuration settings. It separates the global frame received from the multiplexer into audio and text according to the application's settings and uses separate channels (audio channel, text channel) to deliver to the application. The muxed frame may be delivered as-is to the application, allowing the application to perform this function. It also converts native language audio received from the application into native language text using the speech-to-text function and delivers it to the NNI port. The language inputted into the virtual router through the global switch is foreign, and the language outputted to the global switch is native. The default value for language is set to the language used by the device. Multiple conversation groups can be created for each user. At the start of a conversation, tapping the screen will display only the conversation groups that are within the allowed proximity distance, calculated based on the current location of the user and the conversation groups. Instead of tapping the screen, approaching the other person's device to perform an NFC action or recognizing the event generated after a collision can also automatically select the conversation group.

The first virtual router 33 includes a speech-to-text engine 36 and a translation engine 37. The speech-to-text engine 36 of the first virtual router 33 is constructed to convert the first user's spoken language in the first language into transcribed texts in the first language and send the transcribed texts in the first language to the global switch. In addition, the translation engine 37 of the first virtual router 33 is configured to receive texts in a language other than the first language and is constructed to translate the texts in the language other than the first language into translated texts in the first language.

The second virtual router 33 includes a speech-to-text engine 36 and a translation engine 37 as well. The speech-to-text engine 36 of the second virtual router 33 is constructed to convert the second user's spoken language in the second language into transcribed texts in the second language and send the transcribed texts in the second language to the global switch. In addition, the translation engine 37 of the second virtual router 33 is configured to receive texts in a language other than the second language and is constructed to translate the texts in the language other than the second language into translated texts in the second language. During a conversation between the first electronic device 10 and the second electronic device 20, the global switch is configured to send the transcribed texts in the first language to the translation engine of the second virtual router and send the transcribed texts in the second language to the translation engine of the first virtual router.

The PPCC system 100 may be constructed to initiate the conversation between the first electronic device 10 and the second electronic device 20 by using Near Field Communication ("NFC") handshake or Bluetooth pairing handshake between the first electronic device 10 and the second electronic device 20. Alternatively or additionally, the PPCC system 100 may be constructed to initiate the conversation between the first electronic device 10 and the second electronic device 20 by detecting a collision between the first electronic device 10 and the second electronic device 20 using an accelerometer sensor (not shown).

The first virtual router 33 may further include a text-to-speech engine 38 and a multiplexer 39. As shown in FIG. 4, the text-to-speech engine 38 of the first virtual router 33 is configured to receive the translated texts in the first language from the translation engine 37 of the first virtual router and convert them into spoken language in the first language. The multiplexer 39 is configured to receive the translated texts in the first language from the translation engine 37 of the first virtual router 33 and receive the spoken language in the first language from the text-to-speech engine 38 of the first virtual router 33, and the multiplexer 39 is configured to combine the translated texts in the first language and the spoken language in the first language and send them to the PPCC application 12 of the first electronic device 10.

The multiplexer 39 is configured to combine the translated texts in the first language and the spoken language in the first language into data, and the data contains information on the language other than the first language, a length of the translated texts in the first language, and a length of the spoken language in the first language where the information is followed by the translated texts in the first language and the spoken language in the first language as shown in FIG. 5. FIG. 5 illustrates two exemplary types of data frame structures: the upper one displays the data sequence of the language, whether the data was muxed, the length of the text, and the texts; the lower one shows the language, whether the data was muxed, the length of the text, the length of the voice, the texts, and the voice.

FIG. 6 shows the information on user conversation rooms stored in the DBMS. FIGS. 7A, 7B, and 7C illustrate examples of user interfaces for the PPCC application whereas FIGS. 8A and 8B illustrate examples of user interfaces for the settings of the PPCC application.

FIG. 6 displays columns for the account name, conversation room name, location coordinates of the electronic device, and room parameters. The room parameters include language/country, maximum number of participants for the conversation room, privacy settings (private/public), proximity (nearby) between conversation participants, presence of echo, etc. In case of private mode, an access key is provided to be used by others to join the conversation room.

FIGS. 7A, 7B, 7C, 7D show examples of user interface for the conversation window in the PPCC application. It displays the user's native language, conversation room name, and conversation content display window (showing only the other party's, or both the other party's and the user's simultaneously). There are buttons for muting oneself, and for starting/stopping. When starting a conversation, pressing the start button or an empty screen will display a list of conversation rooms the user can join, from which one can be selected to start the conversation. In a broadcasting conversation, the mute function is always displayed as On and cannot be changed. Pressing the exit button will exit the conversation room. Regardless of the language used by the other party, subtitles in the user's native language are displayed on the user's own PPCC application for the content of the other party's conversation (when the speaker is set to On, the other party's speech is also output in the user's native language).

FIG. 7D illustrates an example of three users in a conversation room, each speaking a different language. Their speeches can be differentiated by varying the font, color, or by displaying their name or nickname. Additionally, settings can be adjusted to allow users to hide their name or nickname from others.

FIGS. 8A and 8B show examples of the settings screen for the PPCC application. Users can create their own conversation rooms, and can set conditions for others to join the conversation room. Additionally, they can set conditions for finding conversation rooms created by others.

The PPCC application 12 installed on the first electronic device 10 may be configured to allow the first user to create a conversation room and set a nearby/remote parameter for the conversation room. The nearby/remote parameter provides selection between nearby mode and remote mode such that under the nearby mode, the PPCC application 12 installed on the first electronic device 10 allows another PPCC application installed on another electronic device to join the conversation room if another electronic device is within a pre-determined distance from the first electronic device 10. Under the remove mode, another electronic device can join the conversation irrespective of the distance between the two devices.

Alternatively, the PPCC application 12 installed on the first electronic device 10 may be configured to allow the first user to create a conversation room and set a distance parameter for the conversation room. The distance parameter provides setting a distance such that the PPCC application 12 installed on the first electronic device 10 allows another PPCC application installed on another electronic device to join the conversation room if another electronic device is within the distance from the first electronic device. The distance may be 5 m, 10 m, or 20 m; these are only examples, and this invention is not limited to these values.

The PPCC application 12 installed on the first electronic device 10 may be configured to allow the first user to create a conversation room and set a peer-to-peer/broadcasting parameter, a limit parameter, and a public/private parameter. The peer-to-peer/broadcasting parameter allows selection between peer-to-peer communication, enabling two-way communication, and broadcasting communication, enabling one way communication. The limit parameter allows a maximum number of people to join the conversation room, and the public/private parameter provides selection between public mode and private mode for the conversation room such that the public mode allows the conversation room to be searched while the private mode does not allow the conversation room to be searched.

Figure 9:
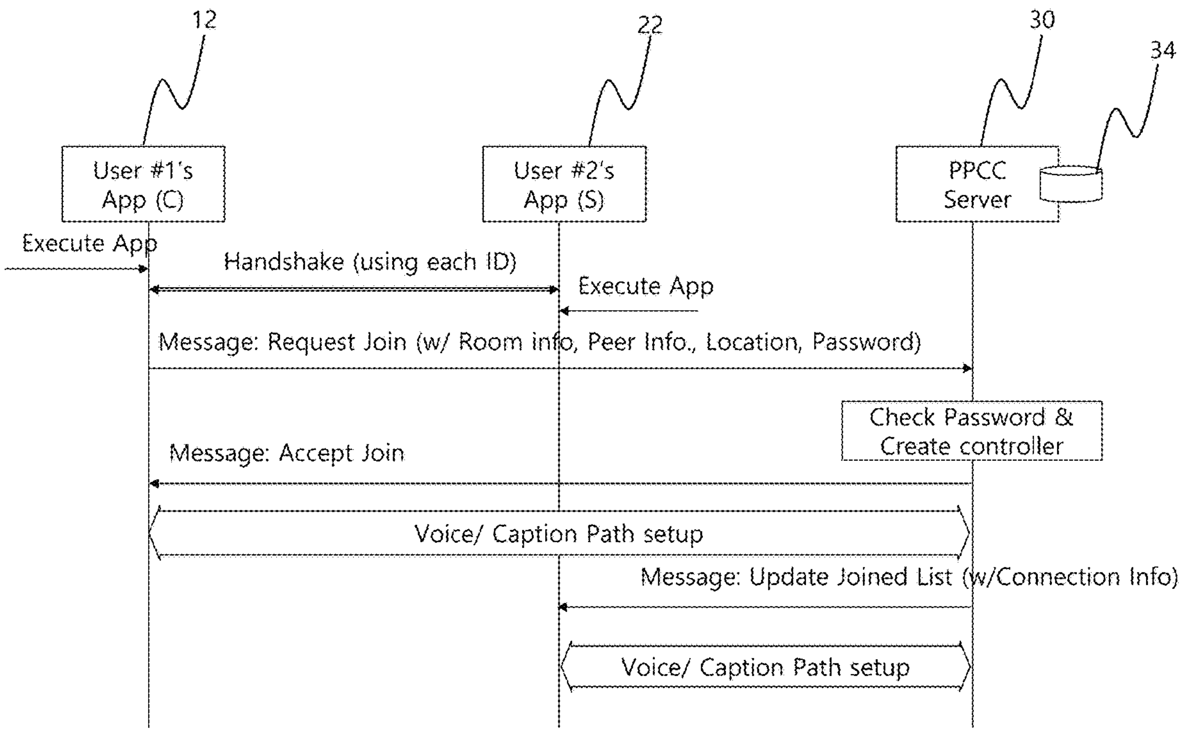
FIG. 9 shows a control procedure to initiate a conversation between the first user application and the second user application using a handshake between the two devices according to the present invention.
Figure 10:
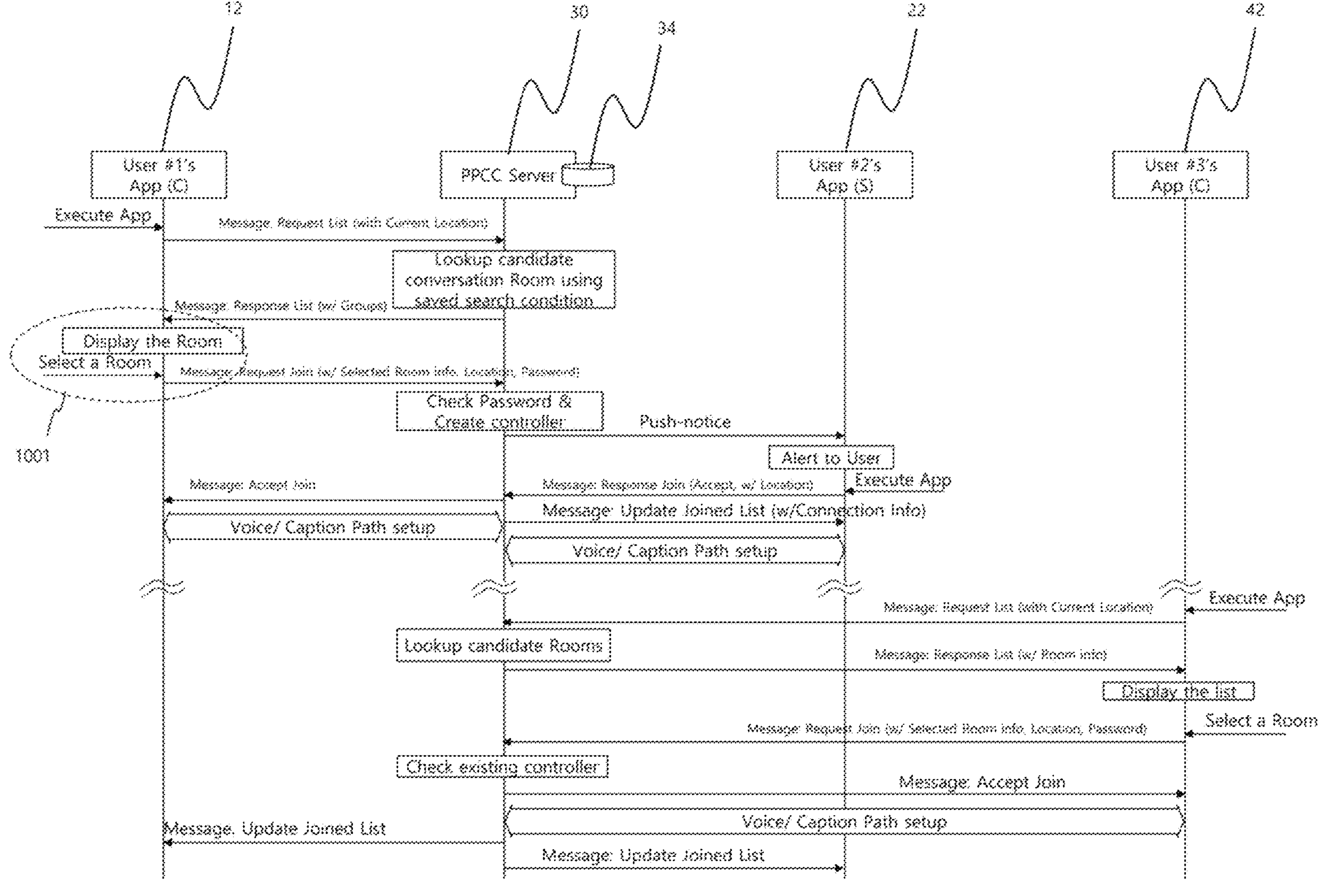
FIG. 10 shows a control procedure to initiate a conversation between the first user application and the second user application and allow the third user application to join the conversation through the PPCC server according to the present invention.
Figure 11:
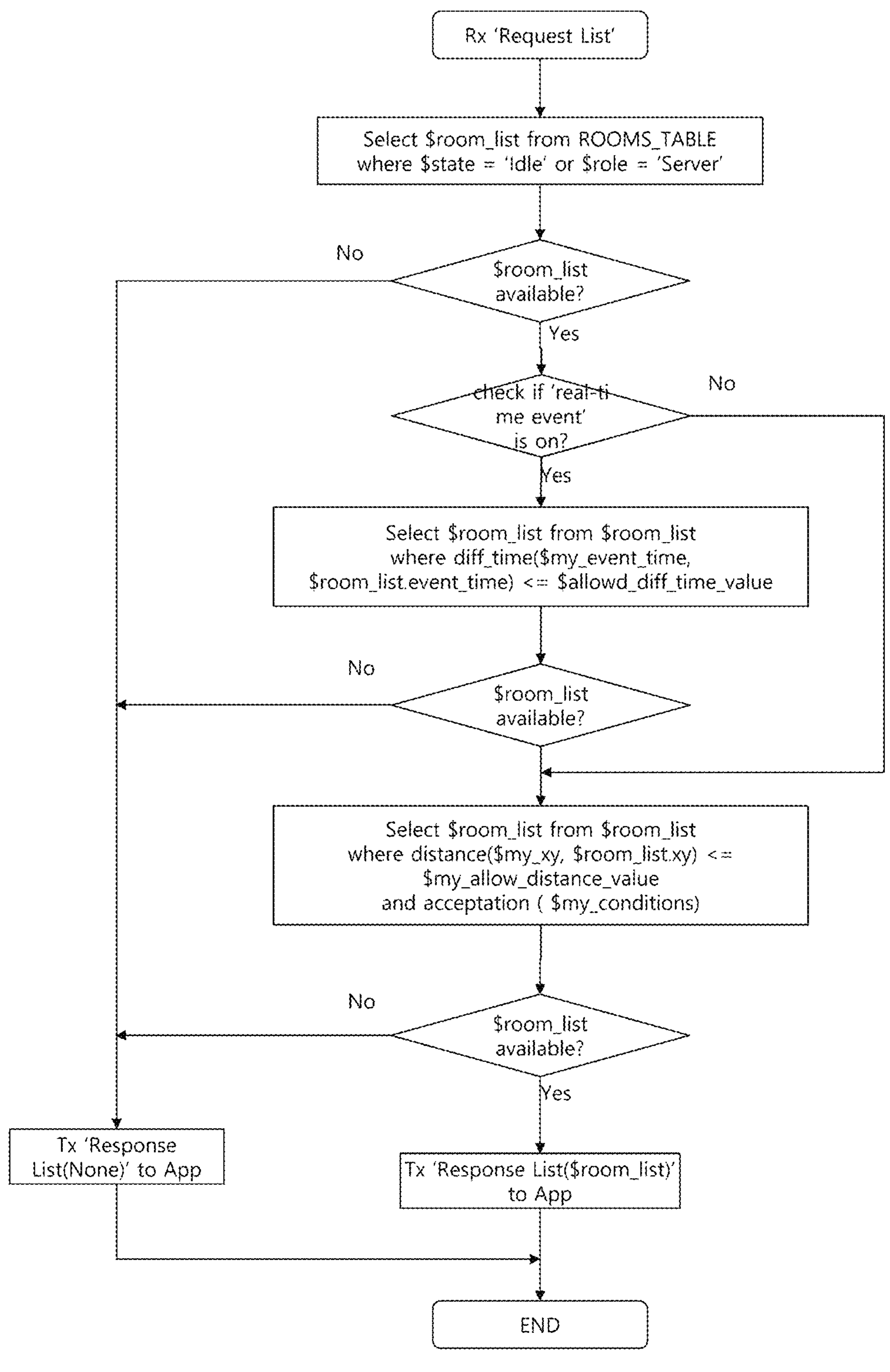
FIG. 11 shows a procedure for selecting conversation rooms by the PPCC server upon a request from a user application according to the present invention.

FIG. 9 shows a control procedure to initiate a conversation between the first user application and the second user application using a handshake between the two devices, and FIG. 10 shows a control procedure to initiate a conversation between the first user application and the second user application and allow the third user application to join the conversation through the PPCC server. FIG. 11 shows a procedure for selecting conversation rooms by the PPCC server upon a request from a user application.

FIG. 9 shows an example of connecting conversation channels by transmitting information between the PPCC applications using short-range communication and then sending the determined values to the server (setting the app that requests the service first as the client). FIG. 10 shows an example of connecting conversation channels by delivering a conversation room list to the application that requests the service first, then selecting the most appropriate conversation room (with the application that requests the service first as the client). In the case of 1001 of FIG. 10, by creating sophisticated mapping logic to find only one conversation room, the process of selecting a conversation room in the client-side app can be reduced—in other words, the procedure can be automated by automatically selecting a conversation room. In addition, FIG. 11 shows an example of logic to find available conversation room lists around the user.

The PPCC system 100 includes the PPCC server 30 which includes a database 34 of conversation rooms. The database 34 includes a conversation room created by the second electronic device 20. Upon a NFC handshake, a Bluetooth paring handshake, or a collision between the first electronic device 10 and the second electronic device 20, the second electronic device 20 is configured to send to the first electronic device 10 the information on the conversation room created by the second electronic device 20 so that the first electronic device 10 can join the conversation room created by the second electronic device 20.

The PPCC system 100 includes the PPCC server 30 which includes a database 34 of conversation rooms. Upon a request from the PPCC application 12 installed on the first electronic device 10, the PPCC system 100 may be configured to provide a list of conversation rooms.

FIG. 11 shows a procedure for selecting conversation rooms by the PPCC server upon a request from a user application.

The PPCC system 100 includes the PPCC server 30 which includes a database 34 of conversation rooms. The database 34 includes a conversation room created by the second electronic device 20. Upon a NFC handshake, a Bluetooth paring handshake, or a collision between the first electronic device 10 and the second electronic device 20, and upon a request from the PPCC application 12 installed on the first electronic device 10, the PPCC system 100 is configured to: receive event times of the NFC handshake, the Bluetooth paring handshake, or the collision respectively from the first electronic device 10 and the second electronic device 20 and calculated a difference in the event times; receive location coordinates respectively from the first electronic device 10 and the second electronic device 20 and calculated a distance between the location coordinates; and provide to the first electronic device 10 a conversation room which satisfies conditions that the difference in the event times is smaller than a pre-determined time and the distance between the location coordinates is smaller than a pre-determined distance.

The PPCC applications operating as a host and idle Rooms may be included in the search criteria whereas rooms operating as clients may be excluded. If the user's settings include a distance, only rooms that fall within the search distance specified by the user are included, based on a comparison between the user's uploaded current location and the locations of other rooms registered in the database. Other remaining search conditions set by the user may be included (private or public, no password protected, and so on).

In the alternative embodiment, the present invention provides a face-to-face conversation captioning ("FFCC") system, which includes a first electronic device for a first user, a second electronic device for a second user, and an FFCC server. The first user's spoken language is a first language, and the second user's spoken language is a second language. An FFCC application is installed respectively on the first electronic device and the second electronic device where the FFCC application of the first electronic device is set to the first language and the FFCC application of the second electronic device is set to the second language. The FFCC system further includes a virtual relay entity, which includes a first virtual router for the first language, a second virtual router for the second language, and a global switch.

The FFCC application of the first electronic device is connected to the first virtual router without passing through the global switch, and the FFCC application of the second electronic device is connected to the second virtual router without passing through the global switch. Furthermore, the global switch is respectively connected to the first virtual router and the second virtual router.

The first virtual router includes a speech-to-text engine and a translation engine. The speech-to-text engine of the first virtual router is constructed to convert the first user's spoken language in the first language into transcribed texts in the first language and send the transcribed texts in the first language to the global switch, and the translation engine of the first virtual router is configured to receive texts in a language other than the first language and is constructed to translate the texts in the language other than the first language into translated texts in the first language.

Likewise, the second virtual router includes a speech-to-text engine and a translation engine. The speech-to-text engine of the second virtual router is constructed to convert the second user's spoken language in the second language into transcribed texts in the second language and send the transcribed texts in the second language to the global switch. The translation engine of the second virtual router is configured to receive texts in a language other than the second language and is constructed to translate the texts in the language other than the second language into translated texts in the second language. During a conversation between the first electronic device and the second electronic device, the global switch is configured to send the transcribed texts in the first language to the translation engine of the second virtual router and send the transcribed texts in the second language to the translation engine of the first virtual router.

The first virtual router further includes a text-to-speech engine and a multiplexer. The text-to-speech engine of the first virtual router is configured to receive the translated texts in the first language from the translation engine of the first virtual router and convert them into spoken language in the first language. The multiplexer is configured to receive the translated texts in the first language from the translation engine of the first virtual router and receive the spoken language in the first language from the text-to-speech engine of the first virtual router, and the multiplexer is configured to combine the translated texts in the first language and the spoken language in the first language and send them to the FFCC application of the first electronic device. The multiplexer is configured to combine the translated texts in the first language and the spoken language in the first language into data, and the data contains information on the language other than the first language, a length of the translated texts in the first language, and a length of the spoken language in the first language, the information being followed by the translated texts in the first language and the spoken language in the first language.

The FFCC application installed on the first electronic device is configured to allow the first user to create a conversation room and set a distance parameter for the conversation room. The distance parameter provides setting a distance such that the FFCC application installed on the first electronic device allows another FFCC application installed on another electronic device to join the conversation room if the another electronic device is within the distance from the first electronic device.

The FFCC application installed on the first electronic device is configured to allow the first user to create a conversation room and set a peer-to-peer/broadcasting parameter, a limit parameter, and a public/private parameter. The peer-to-peer/broadcasting parameter allows selection between peer-to-peer communication, enabling two-way communication, and broadcasting communication, enabling one way communication, wherein the limit parameter allows a maximum number of people to join the conversation room. The public/private parameter provides selection between public mode and private mode for the conversation room such that the public mode allows the conversation room to be searched while the private mode does not allow the conversation room to be searched.

The FFCC system includes the FFCC server which includes a database of conversation rooms. The database includes a conversation room created by the second electronic device. Upon a NFC handshake, a Bluetooth paring handshake, or a collision between the first electronic device and the second electronic device, the second electronic device is configured to send to the first electronic device information on the conversation room created by the second electronic device so that the first electronic device can join the conversation room created by the second electronic device.

The FFCC server includes a database of conversation rooms. The database includes a conversation room created by the second electronic device. Upon a NFC handshake, a Bluetooth paring handshake, or a collision between the first electronic device and the second electronic device, and upon a request from the FFCC application installed on the first electronic device, the FFCC system is configured to: receive event times of the NFC handshake, the Bluetooth paring handshake, or the collision respectively from the first electronic device and the second electronic device and calculated a difference in the event times; receive location coordinates respectively from the first electronic device and the second electronic device and calculated a distance between the location coordinates; and provide to the first electronic device a conversation room which satisfies conditions that the difference in the event times is smaller than a pre-determined time and the distance between the location coordinates is smaller than a pre-determined distance.

While the invention has been shown and described with reference to different embodiments thereof, it will be appreciated by those skilled in the art that variations in form, detail, compositions and operation may be made without departing from the spirit and scope of the invention as defined by accompanying claims.

What is claimed is:

1. A peer to peer conversation captioning ("PPCC") system, comprising:

a first electronic device for a first user, wherein the first user's spoken language is a first language;

a second electronic device for a second user, wherein the second user's spoken language is a second language;

a PPCC application installed respectively on the first electronic device and the second electronic device, wherein the PPCC application of the first electronic device is set to the first language and the PPCC application of the second electronic device is set to the second language; and a virtual relay entity, which includes a first virtual router for the first language, a second virtual router for the second language, and a global switch, wherein the PPCC application of the first electronic device is connected to the first virtual router without passing through the global switch, wherein the PPCC application of the second electronic device is connected to the second virtual router without passing through the global switch, and wherein the global switch is respectively connected to the first virtual router and the second virtual router.

2. The PPCC system of claim 1, wherein the first virtual router includes a speech-to-text engine and a translation engine, wherein the speech-to-text engine of the first virtual router is constructed to convert the first user's spoken language in the first language into transcribed texts in the first language and send the transcribed texts in the first language to the global switch, and wherein the translation engine of the first virtual router is configured to receive texts in a language other than the first language and is constructed to translate the texts in the language other than the first language into translated texts in the first language.

3. The PPCC system of claim 2, wherein the second virtual router includes a speech-to-text engine and a translation engine, wherein the speech-to-text engine of the second virtual router is constructed to convert the second user's spoken language in the second language into transcribed texts in the second language and send the transcribed texts in the second language to the global switch, wherein the translation engine of the second virtual router is configured to receive texts in a language other than the second language and is constructed to translate the texts in the language other than the second language into translated texts in the second language, and wherein during a conversation between the first electronic device and the second electronic device, the global switch is configured to send the transcribed texts in the first language to the translation engine of the second virtual router and send the transcribed texts in the second language to the translation engine of the first virtual router.

4. The PPCC system of claim 3, wherein the PPCC system is constructed to initiate the conversation between the first electronic device and the second electronic device by using Near Field Communication ("NFC") handshake or Bluetooth pairing handshake between the first electronic device and the second electronic device.

5. The PPCC system of claim 3, wherein the PPCC system is constructed to initiate the conversation between the first electronic device and the second electronic device by detecting a collision between the first electronic device and the second electronic device using an accelerometer sensor.

6. The PPCC system of claim 2, wherein the first virtual router further includes a text-to-speech engine and a multiplexer, wherein the text-to-speech engine of the first virtual router is configured to receive the translated texts in the first language from the translation engine of the first virtual router and convert them into spoken language in the first language, wherein the multiplexer is configured to receive the translated texts in the first language from the translation engine of the first virtual router and receive the spoken language in the first language from the text-to-speech engine of the first virtual router, and wherein the multiplexer is configured to combine the translated texts in the first language and the spoken language in the first language and send them to the PPCC application of the first electronic device.

7. The PPCC system of claim 6, wherein the multiplexer is configured to combine the translated texts in the first language and the spoken language in the first language into data, wherein the data contains information on the language other than the first language, a length of the translated texts in the first language, and a length of the spoken language in the first language, the information being followed by the translated texts in the first language and the spoken language in the first language.

8. The PPCC system of claim 1, wherein the PPCC application installed on the first electronic device is configured to allow the first user to create a conversation room and set a nearby/remote parameter for the conversation room, wherein the nearby/remote parameter provides selection between nearby mode and remote mode such that under the nearby mode, the PPCC application installed on the first electronic device allows another PPCC application installed on another electronic device to join the conversation room if the another electronic device is within a pre-determined distance from the first electronic device.

9. The PPCC system of claim 1, wherein the PPCC application installed on the first electronic device is configured to allow the first user to create a conversation room and set a distance parameter for the conversation room, wherein the distance parameter provides setting a distance such that the PPCC application installed on the first electronic device allows another PPCC application installed on another electronic device to join the conversation room if the another electronic device is within the distance from the first electronic device.

10. The PPCC system of claim 1, wherein the PPCC application installed on the first electronic device is configured to allow the first user to create a conversation room and set a peer-to-peer/broadcasting parameter, a limit parameter, and a public/private parameter, wherein the peer-to-peer/broadcasting parameter allows selection between peer-to-peer communication, enabling two-way communication, and broadcasting communication, enabling one way communication, wherein the limit parameter allows a maximum number of people to join the conversation room, and wherein the public/private parameter provides selection between public mode and private mode for the conversation room such that the public mode allows the conversation room to be searched while the private mode does not allow the conversation room to be searched.

11. The PPCC system of claim 1, further comprising a PPCC server which includes a database of conversation rooms, wherein the database includes a conversation room created by the second electronic device, wherein upon a NFC handshake, a Bluetooth paring handshake, or a collision between the first electronic device and the second electronic device, the second electronic device is configured to send to the first electronic device information on the conversation room created by the second electronic device so that the first electronic device can join the conversation room created by the second electronic device.

12. The PPCC system of claim 1, further comprising a PPCC server which includes a database of conversation rooms, wherein upon a request from the PPCC application installed on the first electronic device, the PPCC system is configured to provide a list of conversation rooms.

13. The PPCC system of claim 1, further comprising a PPCC server which includes a database of conversation rooms, wherein the database includes a conversation room created by the second electronic device, wherein upon a NFC handshake, a Bluetooth paring handshake, or a collision between the first electronic device and the second electronic device, and upon a request from the PPCC application installed on the first electronic device, the PPCC system is configured to:

receive event times of the NFC handshake, the Bluetooth paring handshake, or the collision respectively from the first electronic device and the second electronic device and calculated a difference in the event times;

receive location coordinates respectively from the first electronic device and the second electronic device and calculated a distance between the location coordinates; and provide to the first electronic device a conversation room which satisfies conditions that the difference in the event times is smaller than a pre-determined time and the distance between the location coordinates is smaller than a pre-determined distance.

14. A face-to-face conversation captioning ("FFCC") system, comprising:

a first electronic device for a first user, wherein the first user's spoken language is a first language;

a second electronic device for a second user, wherein the second user's spoken language is a second language;

an FFCC application installed respectively on the first electronic device and the second electronic device, wherein the FFCC application of the first electronic device is set to the first language and the FFCC application of the second electronic device is set to the second language; and a virtual relay entity, which includes a first virtual router for the first language, a second virtual router for the second language, and a global switch, wherein the FFCC application of the first electronic device is connected to the first virtual router without passing through the global switch, wherein the FFCC application of the second electronic device is connected to the second virtual router without passing through the global switch, and wherein the global switch is respectively connected to the first virtual router and the second virtual router.

15. The FFCC system of claim 1, wherein the first virtual router includes a speech-to-text engine and a translation engine, wherein the speech-to-text engine of the first virtual router is constructed to convert the first user's spoken language in the first language into transcribed texts in the first language and send the transcribed texts in the first language to the global switch, wherein the translation engine of the first virtual router is configured to receive texts in a language other than the first language and is constructed to translate the texts in the language other than the first language into translated texts in the first language, wherein the second virtual router includes a speech-to-text engine and a translation engine, wherein the speech-to-text engine of the second virtual router is constructed to convert the second user's spoken language in the second language into transcribed texts in the second language and send the transcribed texts in the second language to the global switch, wherein the translation engine of the second virtual router is configured to receive texts in a language other than the second language and is constructed to translate the texts in the language other than the second language into translated texts in the second language, and wherein during a conversation between the first electronic device and the second electronic device, the global switch is configured to send the transcribed texts in the first language to the translation engine of the second virtual router and send the transcribed texts in the second language to the translation engine of the first virtual router.

16. The FFCC system of claim 15, wherein the first virtual router further includes a text-to-speech engine and a multiplexer, wherein the text-to-speech engine of the first virtual router is configured to receive the translated texts in the first language from the translation engine of the first virtual router and convert them into spoken language in the first language, wherein the multiplexer is configured to receive the translated texts in the first language from the translation engine of the first virtual router and receive the spoken language in the first language from the text-to-speech engine of the first virtual router, wherein the multiplexer is configured to combine the translated texts in the first language and the spoken language in the first language and send them to the FFCC application of the first electronic device, wherein the multiplexer is configured to combine the translated texts in the first language and the spoken language in the first language into data, wherein the data contains information on the language other than the first language, a length of the translated texts in the first language, and a length of the spoken language in the first language, the information being followed by the translated texts in the first language and the spoken language in the first language.

17. The FFCC system of claim 14, wherein the FFCC application installed on the first electronic device is configured to allow the first user to create a conversation room and set a distance parameter for the conversation room, wherein the distance parameter provides setting a distance such that the FFCC application installed on the first electronic device allows another FFCC application installed on another electronic device to join the conversation room if the another electronic device is within the distance from the first electronic device.

18. The FFCC system of claim 14, wherein the FFCC application installed on the first electronic device is configured to allow the first user to create a conversation room and set a peer-to-peer/broadcasting parameter, a limit parameter, and a public/private parameter, wherein the peer-to-peer/broadcasting parameter allows selection between peer-to-peer communication, enabling two-way communication, and broadcasting communication, enabling one way communication, wherein the limit parameter allows a maximum number of people to join the conversation room, and wherein the public/private parameter provides selection between public mode and private mode for the conversation room such that the public mode allows the conversation room to be searched while the private mode does not allow the conversation room to be searched.

19. The FFCC system of claim 14, further comprising a FFCC server which includes a database of conversation rooms, wherein the database includes a conversation room created by the second electronic device, wherein upon a NFC handshake, a Bluetooth paring handshake, or a collision between the first electronic device and the second electronic device, the second electronic device is configured to send to the first electronic device information on the conversation room created by the second electronic device so that the first electronic device can join the conversation room created by the second electronic device.

20. The FFCC system of claim 14, further comprising a FFCC server which includes a database of conversation rooms, wherein the database includes a conversation room created by the second electronic device, wherein upon a NFC handshake, a Bluetooth paring handshake, or a collision between the first electronic device and the second electronic device, and upon a request from the FFCC application installed on the first electronic device, the FFCC system is configured to:

receive event times of the NFC handshake, the Bluetooth paring handshake, or the collision respectively from the first electronic device and the second electronic device and calculated a difference in the event times;

receive location coordinates respectively from the first electronic device and the second electronic device and calculated a distance between the location coordinates; and provide to the first electronic device a conversation room which satisfies conditions that the difference in the event times is smaller than a pre-determined time and the distance between the location coordinates is smaller than a pre-determined distance.

* * * * *